United States Patent [19]

Sviridov et al.

[11] 4,438,750
[45] Mar. 27, 1984

[54] DEVICE FOR FUEL DELIVERY TO INTERNAL COMBUSTION ENGINE WITH VAPORIZATION OF INJECTED FUEL

[75] Inventors: Jury B. Sviridov; Alexandr M. Andreev; Vadim V. Kozlovsky; Alexandr M. Lukin; Evgeny V. Novikov, all of Leningrad, U.S.S.R.

[73] Assignee: Nauchno Proizvodstvennoe Obiedienenie Po Toplivnoi Apparature Dvigatelei, Leningrad, U.S.S.R.

[21] Appl. No.: 335,211

[22] Filed: Dec. 28, 1981

[51] Int. Cl.³ .................................................. F02M 31/00
[52] U.S. Cl. ................................... 123/557; 123/553; 123/545; 123/546
[58] Field of Search ............... 123/557, 558, 553, 546, 123/545, 547, 543; 261/145, 144; 165/52

[56] References Cited

U.S. PATENT DOCUMENTS

| | | | |
|---|---|---|---|
| 1,210,533 | 1/1917 | Renault | 123/557 |
| 1,453,187 | 4/1923 | Runford | 123/557 |
| 1,532,770 | 4/1925 | Mader | 123/543 |
| 1,536,299 | 5/1925 | Kummer | 123/546 |
| 1,608,018 | 11/1926 | Eldred | 123/543 |
| 2,999,486 | 9/1961 | Guarnaschelli | 123/546 |
| 3,530,844 | 9/1970 | Kawai | 123/546 |
| 3,886,919 | 6/1975 | Freeman | 123/557 |
| 3,930,477 | 1/1976 | Jordan | 123/546 |
| 4,086,893 | 5/1978 | Bzrnecker | 123/557 |
| 4,316,442 | 2/1982 | McGlinnis | 123/546 |

FOREIGN PATENT DOCUMENTS

| 2306362 | 8/1974 | Fed. Rep. of Germany | 123/543 |
|---|---|---|---|
| 106761 | 7/1917 | United Kingdom | 123/547 |

Primary Examiner—Ronald H. Lazarus
Attorney, Agent, or Firm—Murray Schaffer

[57] ABSTRACT

Disclosed is a device for fuel delivery to an internal combustion engine, comprising a vaporizing element whose one section is heated by exhaust gases and the other section is disposed in an intake duct and has an operating surface, a fuel charge being injected onto said surface by an injection nozzle. In this device the operating surface of the vaporizing element extends from its section heated by the exhaust gases to a diametrically opposite portion of the intake duct, and the orifice of the injection nozzle is directd tangentially as close to the operating surface of the vaporizing element as possible.

7 Claims, 4 Drawing Figures

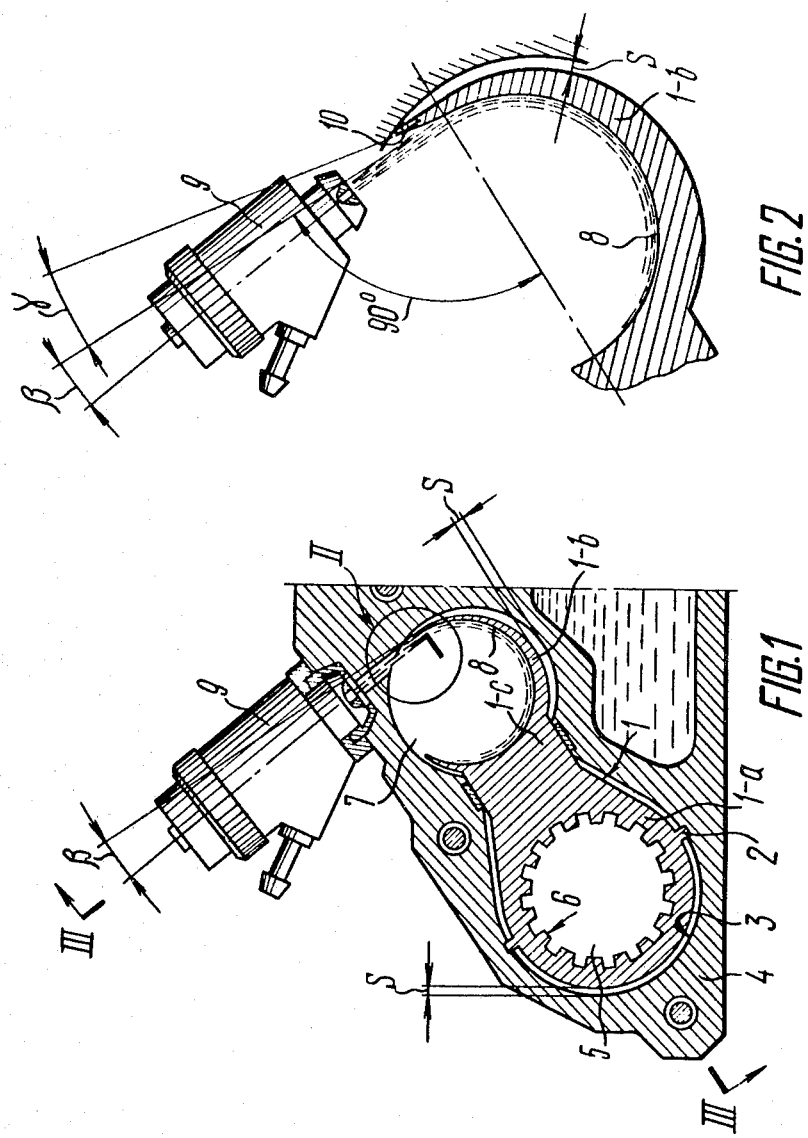

DEVICE FOR FUEL DELIVERY TO INTERNAL COMBUSTION ENGINE WITH VAPORIZATION OF INJECTED FUEL

FIELD OF THE INVENTION

The present invention relates to fuel systems of internal combustion engines utilizing gasoline or any other automotive fuel of multifraction composition as a combustible. More particularly, the present invention relates to a device for fuel delivery to an internal combustion engine with vaporization of injected fuel.

The invention can be used most advantageously in fuel systems of internal combustion engines with individual fuel injection into each engine cylinder by an electromagnetically controlled injection nozzle, and particularly in fuel systems of low-power engines for automobiles running in conditions imposing strict limitations on the noxious exhaust gas emission.

BACKGROUND OF THE INVENTION

It is well known that the most favourable conditions for internal combustion engine operation are provided when the cylinders are fed with a homogeneous air-fuel mixture, i.e. such as mixture in which all the fuel is in a vapor phase. These conditions make it possible to accomplish a number of objects, the prinicpal ones being as follows: to increase the efficiency of fuel combustion due to a high rate and uniformity of the process of fuel burning to a complete burn-up of the fuel, to reduce the noxious exhaust gas emission, and to improve fuel economy of the engine due to the increase of the completeness of fuel combustion and of the limit of efficient leaning of the air-fuel mixture. Thus, taking into account present-day energy and ecological problems, it is readily apparent that the achievement of homogeneity of an air-fuel mixture when delivering fuel to an internal combustion engine is an important and urgent problem. The efforts of the designers of fuel systems for internal combustion engines are directed towards solving this problem.

One of the ways of solving said problem consists in providing previous vaporization of fuel in an intake duct when the fuel is supplied onto the surface of a vaporizing element. In this respect there was developed a number of devices for fuel delivery to an internal combustion engine employing both centralized fuel supply to all the engine cylinders and individual fuel injection into each engine cylinder. Some of these devices providing better understanding of the objects of the present invention as well as of the features and advantages thereof are described below.

Thus, known in the prior art is a device for fuel delivery to an internal combustion engine, comprising a vaporizing element disposed in an intake duct and made as a number of tubes on which operating surface a fuel atomized by a carburetor is continuously fed and which have a heat-transfer agent circulating therein and transferring the heat of exhaust gases due to its evaporation in a boiler and condensation on the inner walls of the tubes. The boiling point of this heat-transfer agent has a definite value sufficient for vaporization of all the fractions of a gasoline used as a fuel and provides operation of the entire operating surface of the vaporizing element at this temperature (Tony Curtis, "Meet the Vapipe," Motor, London, 1973, Vol. 143, No. 3688, p. 26–27). A limitation of the temperature in this device to a definite value considerably reduces thermal decomposition of the fuel and prevents it from autoignition in the intake duct, which may occur in devices with a vaporizing element whose operating surface has a temperature which is not adjusted and may reach undue values. However, this device cannot provide complete evaporation of all fuel fraction. This is caused by the fact that the operating surface of its vaporizing element is an isothermal one and gasoline fractions have different boiling points. Specifically, light fractions boil at temperatures of 28° to 65° C. and heavy ones boil at 190° to 230° C. When the fuel gets onto the high-temperature operating surface of the vaporizing element, the light fuel fractions instantly evaporating form a vapor cushion under a liquid fuel layer, that, on the one hand, sharply reduces heat-transfer intensity which retards evaporation of the remaining liquid fuel layer and, on the other hand, promotes detachment of liquid layer droplets by an air flow and their entrainment into the engine cylinder. Besides, when the temperature of the operating surface of the vaporizing element is maintained at a value required for vaporization of the heaviest fuel fraction, it may turn out that this temperature is too high for the light fractions and they are subjected to thermal decomposition.

Formation of a vapor cushion and thermal decomposition of all fuel fractions are eliminated in a device for fuel delivery to an internal combustion engine, in which the temperature field of the operating surface of the vaporizating element is not an isothermal one and the temperature increases from the values equal to, or even lower than, the boiling point of the light fuel fractions up to the values exceeding the boiling point of the heavy fuel fractions. This temperature rise occurs in the direction of motion of fuel continuously fed as a film through an annular slot in the wall of an intake duct (a patent application filed in the U.S., Ser. No. 83,312, Oct. 10, 1979). Due to progressive fraction-by-fraction vaporization of fuel preventing its thermal decomposition, such a design makes it possible to provide complete evaporation of all the fuel fractions and supply of a homogeneous air-fuel mixture into the engine cylinders.

However, in this device, as well as in the device considered hereinabove, fuel vaporization on the operating surface of the vaporizing element is performed with a continuous fuel supply, and this makes it impossible to provide exactly metered fuel delivery to the internal combustion engine cylinders. Indeed, these two devices are intended for use in systems of centralized fuel delivery to all the engine cylinders, but because of a phase overlap and difference in the lengths of connection pipes of an intake manifold the engine cylinders extract portions of the air-fuel mixture from the common flow thereof non-uniformly and different in fraction composition.

A U.S. Pat. No. 3,461,850, Aug. 19, 1969, discloses a device for fuel delivery to an internal combustion engine with vaporization of injected fuel metered out by injection nozzles separately to each engine cylinder. This device which is the nearest analog of the present invention comprises an intake and an exhaust duct, a vaporizing element having its one section heated by the heat of exhaust gases passing through the exhaust duct and the other section with an operating surface, disposed in the intake duct and forming a part of its wall, and an injection nozzle for fuel injection directed with its orifice onto the operating surface of the vaporizing element. The vaporizing element of this device constitutes such a part of the wall of the intake duct which in the zone of arrangement of the vaporizing element is also a part of the wall of the exhaust duct such that the heat of the exhaust gases is transferred to the operating surface of the vaporizing element through a common part of the walls of the intake and exhaust ducts thus providing efficient heating of this surface, the temperature field of the operating surface of such a vaporizing element being close to an isothermal one. The injection nozzle in the device under consideration is disposed on the diametrically opposite side of the intake duct with respect to the operating surface of the vaporizing element.

In such a device, it is impossible to provide stable and complete evaporation of all the fuel fractions in the course of engine operation because of an isothermal temperature field of the operating surface of the vaporizing element as mentioned hereinabove. In this case, the temperature of the operating surface of such a vaporizing element may vary with variations in the engine duty and may be either too low when the heavy fractions do not evaporate or too high when the fuel is subjected to thermal decomposition. Besides, fuel injection onto the operating surface of the vaporizing element through the entire suction air flow moving at a high rate may cause spraying of the fuel jet and entrainment of its droplets into the engine cylinder. The entrainment of fuel droplets into the engine cylinder is also possible because of their entry into the suction air flow after the jet of the injected fuel impinges on the operating surface of the vaporizing element at an angle close to a right one.

SUMMARY OF THE INVENTION

It is an object of the present invention to provide a device for fuel delivery to an internal combustion engine with vaporization of injected fuel which would make it possible to accomplish complete homogenization of an air-fuel mixture before it enters the engine cylinder such as to ensure complete fraction-by-fraction fuel evaporation under conditions eliminating fuel thermal decomposition and to prevent the fuel droplets from being entrained into the engine cylinder. This object is directly aimed at improving economic and ecological characteristics of the internal combustion engine.

Another object of the present invention is to provide reliable operation of the device in accordance with the principal object under all operating conditions of the internal combustion engine.

A further object of the present invention is to provide a device in accordance with the aforementioned objects which would be of a relatively simple construction and easy in manufacture.

Still another object of the present invention is to provide a device in accordance with the aforementioned objects which would not require substantial modifications of other units of the internal combustion engine and could be rather easily realized on existing engine production lines.

These and other objects and advantages of the present invention will become more apparent from the following detailed description of the invention.

With these objects in view, there is provided a device for fuel delivery to an internal combustion engine with vaporization of injected fuel comprising an intake and an exhaust duct, a vaporizing element having its one section heated by the heat of exhaust gases passing through the exhaust duct and the other section with an operating surface, disposed in the intake duct and forming a part of its wall, and an injection nozzle for fuel injection directed with its orifice onto the operating surface of the vaporizing element, wherein, according to the invention, the operating surface of the vaporizing element extends from its section which is heated by the heat of the exhaust gases to, at least, a diametrically opposite portion of the intake duct, the orifice of the injection nozzle being directed onto this, farthest removed from the heated section zone of the operating surface of the vaporizing element as close to the direction of the tangent to this surface as possible.

Due to such a design, the temperature field of the operating surface of the vaporizing element in the course of operation of the internal combustion engine has a temperature gradient directed from the zone onto which the fuel is injected to the zone of the operating surface of the vaporizing element which is in the immediate vicinity to the section of the vaporizing element heated by the heat of the exhaust gases, the fuel in the form of a thin film moving in the direction of the temperature gradient of the operating surface of the vaporizing element which is accomplished due to its injection in the direction close to that of the tangent to the operating surface of the vaporizing element. All these factors provide fraction-by-fraction fuel evaporation. The thermal balance is easily calculated such that for all the operating conditions of the internal combustion engine the temperature of the zone of the operating surface of the vaporizing element onto which the fuel is injected would not exceed the boiling point of the lightest fuel fractions and, preferably, would be equal to it, and the temperature of the zone of the operating surface of the vaporizing element, disposed in the immediate vicinity to the section of the vaporizing element heated by the heat of the exhaust gases, would be greater than the boiling point of the heaviest fuel fraction. This provides reliable successive fraction-by-fraction fuel evaporation under all operating conditions of the internal combustion engine. In accordance with the present invention, the fuel is injected in the direction as close to the direction of the tangent to the operating surface of the vaporizing element as possible, deviation from the tangent caused by the tapering of the fuel cone being insignificant. Besides ensuring fuel motion in the form of a thin film, this makes it possible to prevent the fuel from spattering as it impinges on the operating surface of the vaporizing element. What is more, such an arrangement of the injection nozzle and vaporizing element allows to attain a very short length of a fuel path through the suction air flow from the injection nozzle to the operating surface of the vaporizing element, which permits reducing to zero the spraying of the fuel in the course of its injection. All these factors make it possible to provide homogeneity of the air-fuel mixture when delivering fuel to an internal combustion engine and, at the same time, to employ therein a separated fuel system with individual metered out fuel injection into each cylinder.

The vaporizing element of the device according to the main embodiment of the invention may be made of a highly heat-conducting material as a separate component part which extends from the exhaust duct into the intake duct and is mounted with its sections disposed in these ducts with a heat-insulating clearance relative to the datum surfaces. This makes it possible to provide required thermal operating conditions for the vaporizing element in a more exact and easier way. Besides, this allows to simplify tooling-up for production of internal combustion engines with a device for fuel delivery thereto made in accordance with the present invention. To this end, it is also advisable that the vaporizing element made as a separate component part would be mounted in a base member which has inner spaces and datum surfaces to accomodate the vaporizing element and is adapted for installation between the head of a cylinder block and the connection pipes of the intake and exhaust ducts.

The vaporizing element made as a separate component part may have a number of sections disposed in the intake ducts and a number of sections disposed in the exhaust ducts and intended for a number of cylinders of the internal combustion engine. This allows reducing the number of parts, which may be useful in the manufacture of the internal combustion engine.

The objects and advantages of the present invention will become more apparent upon the following detailed description of its embodiments taken with reference to the accompanying drawings, wherein:

BRIEF DESCRIPTION OF THE ACCOMPANYING DRAWINGS

FIG. 1 shows a device for fuel delivery to an internal combustion engine with vaporization of injected fuel, according to the invention, a sectional view taken across the intake and exhaust ducts;

FIG. 2 shows a fragment II of a portion of the device of FIG. 1 at the spot of fuel spray impingement on the operating surface of the vaporizing element, a view in an enlarged scale as compared to FIG. 1;

Figure 3:
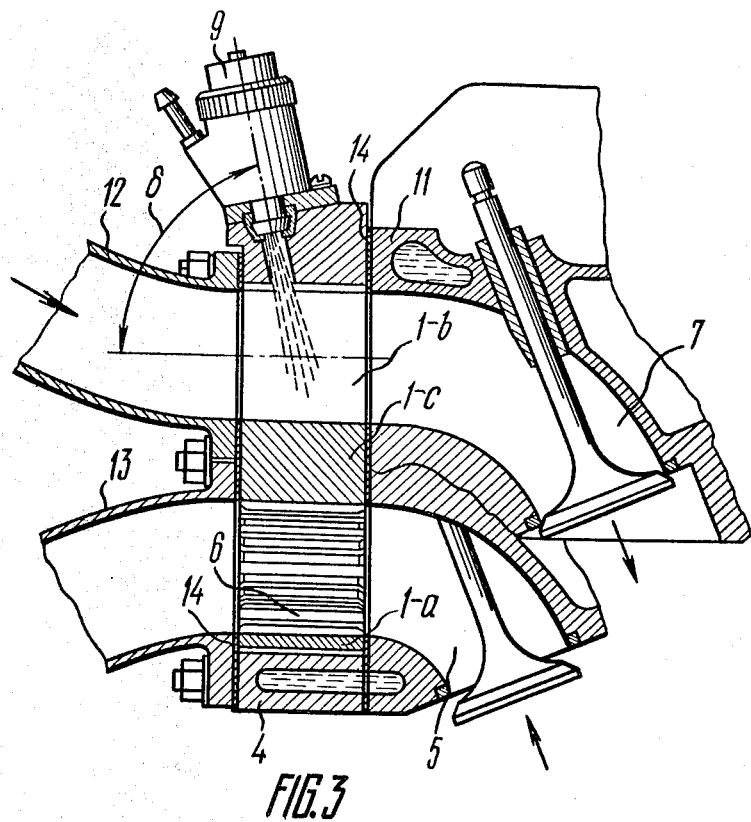
Figure 4:
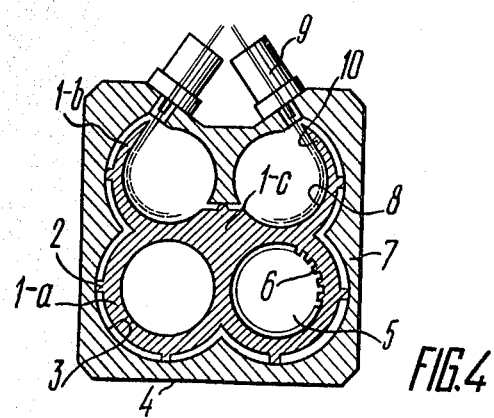

FIG. 3 shows a device of FIG. 1, a view in section III—III taken along the axes of the intake and exhaust ducts and the injection nozzle orifice; and FIG. 4 shows a device for fuel delivery to an internal combustion engine with vaporization of injected fuel, according to the invention, in which the vaporizing element is made as a single component part intended for two engine cylinders, a sectional view taken across the axes of the intake and exhaust ducts.

DETAILED DESCRIPTION OF THE INVENTION

Referring to FIG. 1 of the drawings, there is shown a device for fuel delivery to an internal combustion engine with spark ignition in which a cyclic fuel charge is injected individually into each cylinder. A principal component of this device is a vaporizing element 1 which comprises a section 1-a heated by the heat of exhaust gases, a section 1-b serving to vaporize the gasoline injected thereon, and a connection 1-c communicating these sections and providing heat transfer from the section 1-a to the section 1-b. The vaporizing element 1 is also fitted with locating projections 2 with which it rests on a datum surface 3 of a base member 4. The vaporizing element 1 is made of a highly heat-conducting material, such as a copper or aluminum based alloy, and the base member 4 is made of a material of a relatively low heat conduction, such as steel or heat-resistant plastics. The locating projections 2 provide a clearance "s" between the vaporizing element 1 and the base member 4, which ensures thermal insulation between these parts.

The section 1-a of the vaporizing element has an annular shape, and its inner space 5 represents a portion of an exhaust duct for discharging exhaust gases, the inner surface 6 of the section 1-a being made with longitudinal ribbing to enlarge the surface of heat transfer.

The section 1-b of the vaporizing element extends from the connection 1-c around the periphery of an annular space 7 of the base member 4 to a diametrically opposite portion thereof. The section 1-b forms a part of the wall of an intake duct which in turn forms a part of the annular space 7, the surface 8 of the section 1-b of the vaporizing element being the operating surface thereof and at the same time forming a part of the inner surface of the intake duct. Mounted opposite to the end portion of the operating surface 8 in the base member 4 is an electromagnetically controlled injection nozzle 9. Its orifice has a direction close to that of a tangent to the operating surface 8. Deviation from this direction is caused only by the necessity to provide getting of the entire charge of the injected fuel onto the operating surface 8. Hence, an angle $\beta$ of deviation of the direction of the orifice of the injection nozzle 9 from the tangent to the operating surface 8 is insufficient ranging from 0° to 10° and, specifically, in the illustrated embodiment it is equal to 5°.

For better receiving and further directing the fuel, especially if the angle $\beta$ is equal to zero, the operating surface 8 in the zone of fuel injection is made plane with a bevel 10 (FIG. 2). This bevel may make an angle $\gamma$ with the direction of the orifice of the injection nozzle 9, ranging from 5° to 15° and, specifically, in the illustrated embodiment it is equal to 10°.

To provide complete fuel evaporation, the configuration of the vaporizing element 1 is such as to ensure complete and fraction-by-fraction fuel evaporation under all operating conditions of the internal combustion engine. For example, if it is intended to utilize as a fuel such gasolines as "Regular" or "Premium" having a range of fraction boiling points from 28° to 207° C., the vaporizing element 1 is made such that the temperature of the zone of fuel injection on the operating surface 8 thereof is equal to 25° C. and the temperature close to the connection 1-c is equal to 210° to 230° C.

Referring now to FIG. 3, the orifice of the injection nozzle 9 in a plane passing along the axis of the intake duct 7 is arranged at an angle $\delta$ to this axis, approximately equal to 75°. The inclination of the injection nozzle in said direction provides better conditions for fuel film forming. It is also seen from FIG. 3 that the base member 4 is made with flat end surfaces to provide mating with a head 11 of the cylinder block and attachment of the intake connection pipe 12 and an exhaust connection pipe 13 through which, respectively, the air is sucked in and the exhaust gases are discharged from one of the cylinders of the internal combustion engine. Mounted to seal the connections between the vaporizing element 1, the base member 4, the head 11 of the cylinder block, the intake connection pipe 12 and the exhaust connection pipe 13 are gaskets 14.

The device under consideration operates in a similar way as other known devices with a vaporizing element on whose operating surface a fuel film is vaporized. A cyclic fuel charge per each cylinder is injected onto the operating surface 8 of the vaporizing element 1 and moving over it in the direction of temperature increase evaporates in a fraction-by-fraction manner. The air sucked into the engine cylinder passes through the intake duct 7 and mixing with fuel vapors forms a homogeneous air-fuel mixture supplied to the engine cylinder.

FIG. 4 illustrates an embodiment in which the vaporizing element 1 and the base member 4 are intended for two cylinders of the internal combustion engine. In this embodiment the vaporizing element 1 comprises two sections 1-a heated by the heat of the exhaust gases from two exhaust ducts 5 of two engine cylinders, respectively, two sections 1-b with the operating surfaces 8 disposed in two intake ducts 7 of two engine cylinders, and a common connection 1-c. In spite of the fact that the vaporizing element 1 is an integral part intended to ensure the operation of two engine cylinders, fuel vaporization and fuel delivery to each cylinder are performed independently.

From the above it should be clear that the aforementioned embodiments of the present invention provide efficient evaporation of all fuel fractions and prevent fuel droplets from being entrained into the engine cylinder. This provides fuel economy, reduces the noxious exhaust gas emission, and eliminates the failure of a piston-cylinder pair which may be caused by oil washing-off and dilution under the influence of fuel droplets penetrating into the cylinder. From the description of the embodiments it is also clear that the device according to the present invention is rather simple and may be easily introduced into engine building without significantly modifying the production practice.

It is to be understood that the embodiments of the present invention herewith shown and described are given merely as an illustration without affecting the scope thereof and that numerous variations and modifications of the invention are possible. For example, the vaporizing element may be a part of a single component in which the intake and exhaust ducts are disposed and the injection nozzle is mounted as is in the case of the nearest analog. The section of the vaporizing element heated by the heat of the exhaust gases may be not annular, but shaped as a ribbed projection in the exhaust duct, and vice versa the section of the vaporizing element disposed in the intake passage may have an annular shape with a slot for fuel injection into the zone of the operating surface diametrically opposite to the zone close to the connection between these two sections. It is also apparent that the vaporizing element may be made composite of metals having different heat-transfer coefficients, which makes it possible to reduce the consumption of scarce metals. The vaporizing element may be mounted completely or partially not in a separate base member, but in a chamber specially made in the head of the cylinder block or in the flange of the intake and exhaust manifolds. The surfaces of the vaporizing element and base member, having a clearance formed therebetween may be given a thermal protective coating providing the reduction of heat radiation losses. The present invention may be otherwise embodied within the spirit and scope of the appended claims.

What is claimed is:

1. A device for fuel delivery to an internal combustion engine with vaporization of injected fuel, comprising an intake manifold through which the air is sucked into the engine cylinder, an exhaust manifold through which exhaust gases are discharged, a vaporizing element comprising an elongated member including two end sections, one end section being disposed in the exhaust manifold, the second end section being disposed in and being designed to conform to the walls of the ducts of the intake manifold receiving said second end section, said end section including an operating surface extending along the surface of the intake manifold from the portion of the second end section closest to the first end section to, at least, a diametrically opposite portion of said intake manifold, and an injection nozzle whose orifice is directed onto the diametrically opposite portion of said operating surface of the vaporizing element as close to the direction of a tangent to the operating surface as possible, whereby an injected fuel charge moves circumferentially over the operating surface in the direction of its temperature gradient toward the portion of the second end section closest to the first end section.

2. The device according to claim 1, wherein said vaporizing element is made as a separate component part of a substantially heat-conducting material which extends from said exhaust manifold into said intake manifold and is disposed with its said sections in these manifolds with a heat insulating clearance relative to the surfaces of the receiving spaces.

3. The device according to claim 2, further comprising a base member for supporting said vaporizing element, said base being adapted to be mounted between the head of the engine cylinder block and the connection pipes of its intake and exhaust manifolds.

4. The device according to claim 2, wherein said vaporizing element comprises more than one said section which is disposed in the intake manifold, respectively, for more than one engine cylinder.

5. The device according to claim 3, wherein said vaporizing element comprises more than one said section which is disposed in the intake manifold, respectively, for more than one engine cylinder.

6. The device according to claim 4, wherein said vaporizing element comprises more than one said section which is disposed in the exhaust manifold, respectively, for more than one engine cylinder.

7. The device according to claim 5, wherein said vaporizing element comprises more than one said section which is disposed in the exhaust manifold, respectively, for more than one engine cylinder.

* * * * *